United States Patent
Zhu et al.

(10) Patent No.: US 12,444,785 B2
(45) Date of Patent: Oct. 14, 2025

(54) POWER BATTERY MODULE, POWER BATTERY PACK AND THERMAL MANAGEMENT METHOD OF POWER BATTERY MODULE

(71) Applicant: SHENZHEN FLUENTROP TECHNOLOGY CO., LTD., Guangdong (CN)

(72) Inventors: Yonggang Zhu, Guangdong (CN); Jialin Liang, Guangdong (CN)

(73) Assignee: SHENZHEN FLUENTROP TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/922,057

(22) PCT Filed: Dec. 20, 2021

(86) PCT No.: PCT/CN2021/139620
§ 371 (c)(1),
(2) Date: Oct. 28, 2022

(87) PCT Pub. No.: WO2023/070905
PCT Pub. Date: May 4, 2023

(65) Prior Publication Data
US 2024/0222737 A1    Jul. 4, 2024

(30) Foreign Application Priority Data
Oct. 28, 2021 (CN) .......................... 202111260268.5

(51) Int. Cl.
*H01M 10/63* (2014.01)
*H01M 10/613* (2014.01)
*H01M 10/6557* (2014.01)

(52) U.S. Cl.
CPC ......... *H01M 10/63* (2015.04); *H01M 10/613* (2015.04); *H01M 10/6557* (2015.04)

(58) Field of Classification Search
CPC .............. H01M 10/63; H01M 10/613; H01M 10/6557; H01M 10/617; H01M 10/647;
(Continued)

(56) References Cited

U.S. PATENT DOCUMENTS

| | | | | |
|---|---|---|---|---|
| 2002/0071986 A1* | 6/2002 | Exnar | ................. | H01M 10/613 429/94 |
| 2011/0043038 A1* | 2/2011 | Tsutsumi | ............ | H01M 10/613 429/218.2 |
| 2023/0387526 A1* | 11/2023 | Langley | .............. | H01M 10/647 |

FOREIGN PATENT DOCUMENTS

| CN | 104896983 A | | 9/2015 | |
|---|---|---|---|---|
| CN | 104900937 A | * | 9/2015 | .......... H01M 10/613 |

(Continued)

OTHER PUBLICATIONS

International Search Report (with English translation) dated Jul. 8, 2022 for International Application No. PCT/CN2021/139620, 6 pages.

*Primary Examiner* — Kaity V Chandler
(74) *Attorney, Agent, or Firm* — MH2 Technology Law Group, LLP

(57) ABSTRACT

Disclosed are a power battery module, a power battery pack and a thermal management method of the power battery module. The power battery module includes a plurality of battery cell units, a plurality of heat pipe structures and a plurality of liquid channels, wherein one end of the heat pipe structure is embedded between the battery cell units, and the liquid channel is connected to the other end, which is not embedded into the battery cell unit, of the heat pipe structure, the battery cell unit includes a positive current collector, a positive electrode material, a separator, a negative (Continued)

electrode material and a negative current collector which are arranged in sequence, and two sides of the heat pipe structure are tightly attached to the positive current collector or the negative current collector respectively.

14 Claims, 2 Drawing Sheets

(58) Field of Classification Search
CPC .......... H01M 10/653; H01M 10/6552; H01M 10/6555; H01M 10/6567; H01M 10/6569; Y02E 60/10
See application file for complete search history.

(56) References Cited

FOREIGN PATENT DOCUMENTS

| | | | | |
|---|---|---|---|---|
| CN | 105591174 A | * | 5/2016 | .......... H01M 10/613 |
| CN | 105703036 A | | 6/2016 | |
| CN | 105703038 A | | 6/2016 | |
| CN | 108199115 A | | 6/2018 | |
| CN | 209374492 U | | 9/2019 | |
| CN | 110299484 A | * | 10/2019 | ........ H01M 10/6555 |
| CN | 111341958 A | * | 6/2020 | .......... H01M 10/613 |
| CN | 112421164 A | | 2/2021 | |
| CN | 212934669 U | | 4/2021 | |
| CN | 113036265 A | | 6/2021 | |
| CN | 214254595 U | * | 9/2021 | .......... H01M 10/613 |
| CN | 113991215 A | | 1/2022 | |
| JP | 2013053837 A | | 3/2013 | |
| WO | WO-2021143674 A1 | * | 7/2021 | ......... H05K 7/20336 |

* cited by examiner

POWER BATTERY MODULE, POWER BATTERY PACK AND THERMAL MANAGEMENT METHOD OF POWER BATTERY MODULE

CROSS-REFERENCE TO RELATED APPLICATIONS

This patent application is the U.S. National Phase of PCT International Application No. PCT/CN2021/139620, filed on Dec. 20, 2021, which claims the benefit and priority of Chinese Patent Application No. 202111260268.5, filed with the China National Intellectual Property Administration on Oct. 28, 2021, the disclosure of both of which are incorporated by reference herein in their entireties as part of the present application.

TECHNICAL FIELD

The present disclosure relates to the technical field of power batteries, in particular to a power battery module, a power battery pack and a thermal management method of the power battery module.

BACKGROUND

The service life of the lithium-ion power battery is seriously affected by too high or too low temperature, and even thermal runaway may cause the thermal safety problem of the battery. Therefore, thermal management of the battery plays an important safeguard role in the thermal safety and performance of the battery system.

The electric vehicle battery system trends to improve the energy density, shorten the charging time and be quickly started in a low-temperature environment. Wherein, the energy density needs to be improved from the two aspects of the energy density of a single battery and the system integration. According to the modularization-free technology, the battery cells are directly integrated into a battery pack, the integration from a single battery to a battery module is cancelled, the energy density is improved from the perspective of system integration, and the current development trend of high integration of the battery system is predicted. A traditional thermal management structure is designed on a battery case. Heat is generated in a battery cell and sequentially passes through the contact surface of the battery cell and the case, the case and the contact surface of the case and the heat dissipation element. The heat transfer process is complex. After the battery is aged, the battery expands. The contact surface of the battery cell and the case and the contact surface of the case and the heat dissipation element are difficult to ensure good contact. Therefore, if thermal management is still designed as an external accessory system of the battery pack, future thermal management requirement of a highly integrated battery system is difficult to meet. For example, battery performance degradation is caused by large temperature difference inside and outside the battery pack due to large intermediate thermal resistance; and cooling under super-quick charging and quick preheating of the battery under a low-temperature working condition are difficult to deal with. For example, the Chinese patent with the application publication number of CN105703038A discloses a battery module with flat heat pipes and a heat dissipation method. In the scheme, a plurality of single batteries are arranged in a shell in a stacked mode, and the battery module further comprises a tab fixing device, packing belts, a bottom fixing device and a plurality of flat heat pipes. One flat heat pipe is arranged between every two single batteries; the packing belts are hooped in the notch of the tab fixing device and the notch of the bottom fixing device, and the sealing edge of the single battery is fixed in the through groove of the tab fixing device and the through groove of the bottom fixing device, that is, the flat heat pipes are used for cooling and radiating the single batteries, and only heat radiated to the outside by the single batteries can be radiated, so that the heat dissipation efficiency is low.

The Chinese patent with the publication number of CN105703036A discloses a heat pipe type heat dissipation system of a battery Pack. The heat pipe type heat dissipation system of a battery Pack comprises a battery shell, a battery module and a heat pipe heat dissipation system, wherein the battery module is arranged on the inner side of the battery shell; the heat pipe heat dissipation system comprises a heat conducting plate, a heat pipe and a finned tube; the heat conducting plate is arranged on the battery module; one end of the heat pipe is arranged in the heat conducting plate, and the other end penetrates out of the battery shell; and the finned tube is arranged at the other end of the heat pipe and is arranged on the outer side of the battery shell, so that the battery module is still taken as a unit for heat dissipation in the scheme, but the heat in the battery module cannot be effectively dissipated, and the final heat dissipation efficiency is relatively low. In addition, the Chinese patent with the application publication number of CN113036265A discloses a battery module with a heat pipe. The periphery of a battery cell unit is blocked, and a single battery cell unit is prevented from being ignited to damage other battery cell units and a supporting structure on the periphery of an external copper bar mounting surface, so that a good effect of preventing thermal runaway is achieved. However, the principle of restraining thermal runaway is different from that of the battery module with a heat pipe, so that no effective explanation is made for heat dissipation under normal working conditions. Moreover, the patent does not explicitly define the battery cell units to which the present disclosure refers. Actually, the battery cell unit of the patent is a single battery, which is essentially different from the definition of the battery cell unit of the present disclosure, that is, the patent is still directed to the heat dissipated from the single battery to the outside.

BACKGROUND

The present disclosure aims to provide a power battery module, a power battery pack and a thermal management method of the power battery module so as to solve the problems in the prior art. Two sides of a heat pipe structure are tightly attached to current collectors of a battery cell unit, so that the heat transfer resistance can be reduced, the heat dissipation/preheating speed can be greatly increased, the thermal management effect of the power battery can be improved, and the heat exchange efficiency can be improved.

In order to achieve the purpose, the present disclosure provides the following scheme.

The present disclosure provides a power battery module, comprising a plurality of battery cell units, a plurality of heat pipe structures and a plurality of liquid channels, wherein one end of the heat pipe structure is embedded between the battery cell units, and the liquid channel is connected to the other end, which is not embedded into the battery cell unit, of the heat pipe structure, the battery cell unit comprises a positive current collector, a positive electrode material, a separator, a negative electrode material and a negative current collector which are arranged in sequence, and two sides of the heat pipe structure are tightly attached to the positive current collector or the negative current collector respectively.

Preferably, the outer shell of the heat pipe structure and the current collector tightly attached to the outer shell are made of the same material.

Preferably, the number of the battery cell units between every two adjacent heat pipe structures is more than 20.

Preferably, the heat pipe structure is a flat heat pipe.

Preferably, the flat heat pipe comprises an outer shell, wicks attached to the inner wall of the outer shell and supporting columns arranged between the wicks on the two sides, a steam cavity is formed between the supporting columns, and the flat heat pipe is kept in a closed state and filled with a working medium.

Preferably, the supporting column is a flame-retardant material, and each supporting column is divided into a plurality of sections.

Preferably, the wick comprises a large-aperture foamy copper framework and a nano-coating arranged on the large-aperture foamy copper framework.

The present disclosure provides a power battery pack. The power battery pack comprises a shell and the power battery module packaged in the shell.

The present disclosure also provides a thermal management method of the power battery module, comprising the following steps:

arranging the heat pipe structure between the battery cell units, and tightly attaching the two sides of the heat pipe structure to the current collectors of the battery cell unit respectively, wherein the heat pipe structure is connected with the liquid channel; and monitoring the temperature in the power battery module, and when the temperature is higher than or lower than a set value, cooling or heating a heat exchange fluid flowing through the heat pipe structure to achieve heat exchange between the battery cell unit and the heat exchange fluid.

Preferably, supporting columns made of a flame-retardant material are arranged in the heat pipe structure, a steam cavity is formed between the supporting columns, when an extreme thermal safety accident happens to the power battery module, the outer shell of the heat pipe structure is broken, the closed state of the heat pipe structure is damaged to cause failure of the heat pipe structure, the steam cavity is used for forming a blocking space, heat conduction between the battery cell units is reduced, and thermal runaway spreading is restrained through the combined action of the supporting columns and the steam cavity.

Compared with the prior art, the present disclosure has the following technical effects.

Firstly, the two sides of the heat pipe structure are tightly attached to the current collectors of the battery cell unit, so that the heat transfer resistance can be reduced, the heat dissipation/preheating speed can be greatly increased, the thermal management effect of the power battery can be improved, and the heat exchange efficiency can be improved. Moreover, the outer shell of the heat pipe structure and the current collectors are made of the same material, so that adverse effects caused by operation of the power battery can be avoided on the basis of ensuring the heat transfer effect.

Secondly, thermal management is introduced into the battery pack and is integrated with a battery system, so that the energy density and the thermal management performance of the system can be effectively considered, the thermal management requirements of the high-integration battery system in application scenes such as super-fast charging and low-temperature environments are met, and the problem of poor contact of the contact surface between the battery cell unit and the shell and the contact surface between the outer shell and a heat dissipation element caused by battery aging is also avoided.

Thirdly, when an extreme thermal safety accident (such as a thermal safety accident caused by collision, piercing, short circuit and the like) happens to the battery cell, thermal runaway of the battery cell is inevitable. The working medium in the flat heat pipe may be completely evaporated at high temperature, and the shell is broken to cause failure of the flat heat pipe. The blocking space is formed through the internal steam cavity, so that heat conduction between the battery cells is greatly reduced. Meanwhile, the supporting columns made of the flame-retardant material has good flame-retardant characteristic, and under the combined action with the steam cavity, thermal runaway spreading is restrained.

Fourthly, the liquid channel is connected with external refrigerating and heating equipment, and the external refrigerating and heating equipment provides liquid for cooling and the heat exchange fluid for heating for the liquid channel. When the temperature of the battery is higher than the set value, the heat exchange fluid for cooling is provided; and when the battery is at a lower environment temperature, the heat exchange fluid for heating is provided, so that the temperature of the battery is kept in a reasonable range.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Reference signs: 1, shell; 2, liquid channel; 3, battery cell unit; 31, positive current collector; 32, positive electrode material; 33, separator; 34, negative electrode material; 35, negative current collector; 4, flat heat pipe; 41, outer shell; 42, wick; 43, supporting column; and 44, steam cavity.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide a power battery module, a power battery pack and a thermal management method of the power battery module so as to solve the problems in the prior art. Two sides of a heat pipe structure are tightly attached to current collectors of a battery cell unit, so that the heat transfer resistance can be reduced, the heat dissipation/preheating speed can be greatly increased, the thermal management effect of the power battery can be improved, and the heat exchange efficiency can be improved.

To make the foregoing objective, features and advantages of the present disclosure clearer and more comprehensible, the present disclosure is further described in detail below with reference to the attached figures and specific embodiments.

Figure 2:
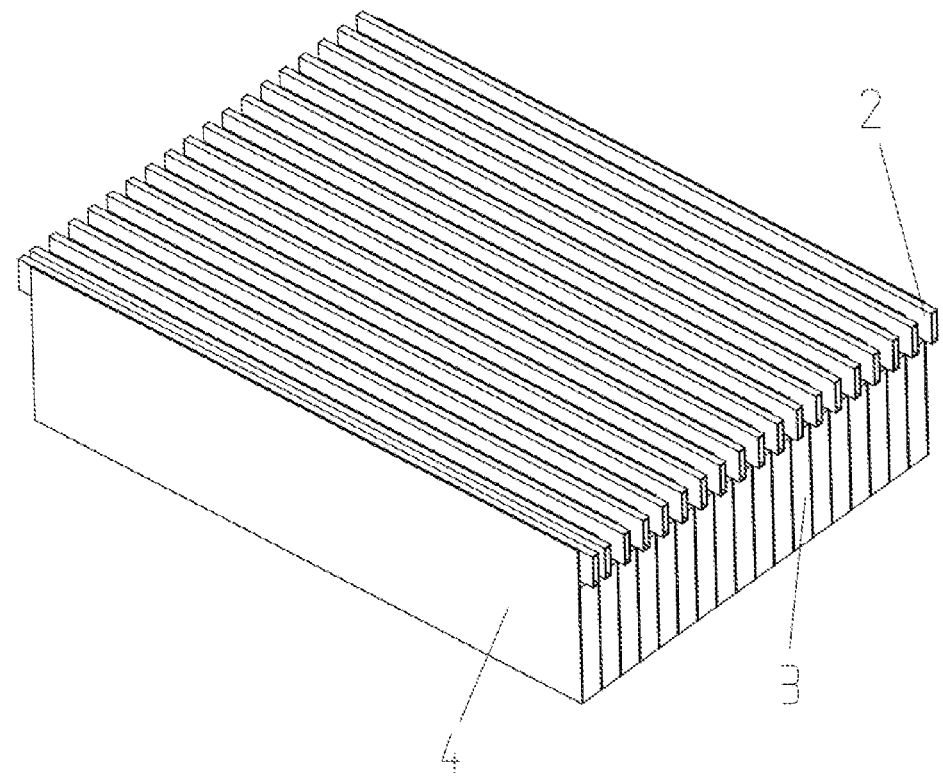
FIG. 2 is a structural schematic diagram of a power battery module in the present disclosure.
Figure 3:
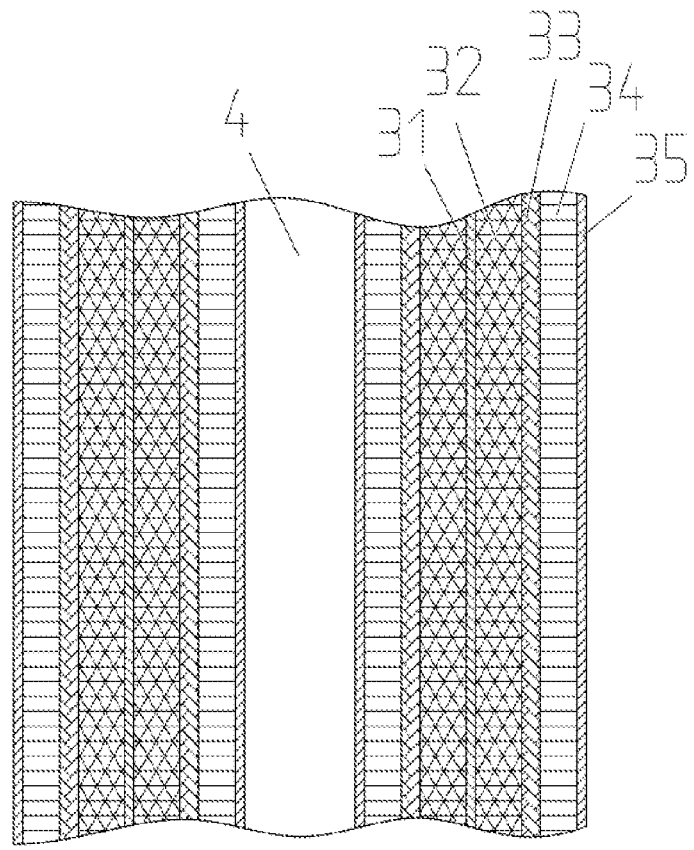
FIG. 3 is a combined schematic diagram of a battery cell unit of a flat heat pipe in the present disclosure.

As shown in FIG. 2, the present disclosure provides a power battery module. The power battery module comprises a plurality of battery cell units 3, a plurality of heat pipe structures and a plurality of liquid channels 2, wherein one end of the heat pipe structure is embedded between the battery cell units 3, and the liquid channel 2 is connected to the other end, which is not embedded into the battery cell unit 3, of the heat pipe structure. Wherein, as shown in FIG. 3, the battery cell unit 3 comprises a positive current collector 31, a positive electrode material 32, a separator 33, a negative electrode material 34 and a negative current collector 35 which are arranged in sequence. Specifically, the current collector (the positive current collector 31 or the negative current collector 35) is attached to the heat pipe structure. A plurality of groups of battery cell units 3 clamped between the heat pipe structures can be arranged side by side, and the specific number is designed according to the heating power and thickness of a single battery cell unit 3. The heat pipe structure in the prior art can be selected and can be a tubular structure or a plate-shaped structure. When the heat pipe structure is the tubular structure, a plurality of battery cell units 3 are arranged in an interlayer between the battery cell units 3 side by side. When the battery cell is of the plate-shaped structure, a plurality of current collectors with the size capable of covering the battery cell units 3 or a whole current collector with the size capable of covering the battery cell units 3 are/is arranged side by side in the interlayer between the battery cell units 3. The heat pipe structure can transfer heat of the battery cell unit 3 to the liquid channel 2 and can also transfer heat of the liquid channel 2 to the battery cell unit 3. The liquid channel 2 is used for introducing refrigerated liquid or heated liquid, and exchange of heat or cold energy transferred to the heat pipe structure by the battery cell unit 3 is achieved. Therefore, thermal management of the power battery module formed by the battery cell unit 3 can be realized by utilizing the heat pipe structure and the liquid channel 2. Two sides of the heat pipe structure are tightly attached to the current collector of the battery cell unit 3 respectively. Here, the current collector can be a positive current collector 31 or a negative current collector 35. The heat pipe structure and the current collector can transfer heat mutually under the condition that the heat pipe structure and the current collector are tightly attached. The heat pipe structure can directly transfer heat generated by the battery cell unit 3 out or transfer heat generated by the outside. Moreover, the tightly attached structure is beneficial to reducing the heat transfer resistance and greatly improving the heat dissipation/preheating speed, so that the thermal management effect of the power battery can be further improved, the heat exchange efficiency is improved, and then the power battery can be suitable for working conditions with large heat production amount and low environment temperature. Therefore, thermal management is introduced into the battery pack (power battery module) and is integrated with a battery system, so that the energy density and the thermal management performance of the system can be effectively considered, and the thermal management requirements of the high-integration battery system in application scenes such as super-fast charging and low-temperature environments are met.

The outer shell 41 of the heat pipe structure can be made of the same material as the current collector, that is, when the heat pipe structure is tightly attached to the positive current collector 31, the heat pipe structure can be made of the same material, such as aluminum, as the positive current collector 31, and when the heat pipe structure is tightly attached to the negative current collector 35, the heat pipe structure can be made of the same material, such as copper, as the negative current collector 35. The outer shell 41 of the heat pipe structure and the current collector are made of the same material, so that adverse effects caused by operation of the power battery can be avoided on the basis of ensuring the heat transfer effect.

The number of the battery cell units 3 between every two adjacent heat pipe structures can be set to be more than 20, and specifically adjustment is carried out according to the heating power and thickness of a single battery cell unit 3.

As shown in FIG. 2, the heat pipe structure can be a flat heat pipe 4, the flat heat pipe 4 is of a plate-shaped structure, a single flat heat pipe 4 can be adopted to cover the whole current collector, the coverage area is large, the integration degree is high, and the flat heat pipe 4 can well adapt to the structure of the power battery and is integrated between battery cell units 3.

Figure 4:
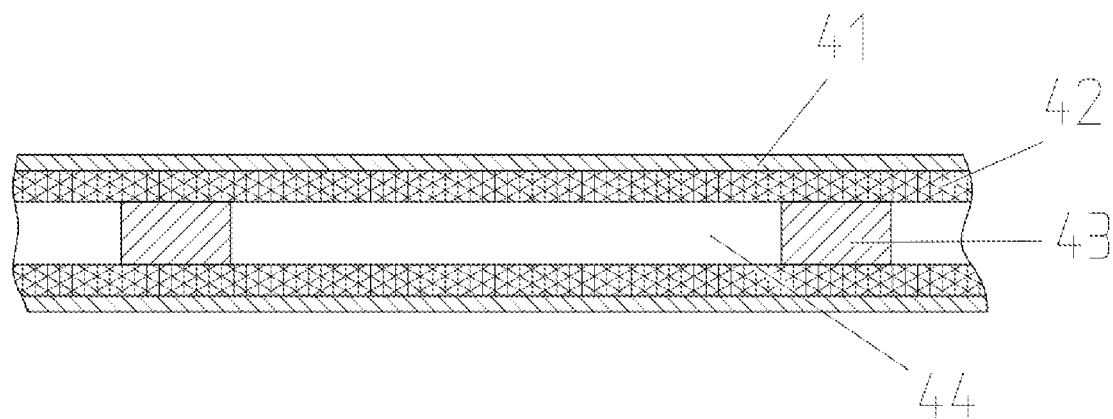
FIG. 4 is a schematic diagram of the internal structure of a flat heat pipe in the present disclosure.

As shown in FIG. 4, the flat heat pipe 4 comprises an outer shell 41, wicks 42 attached to the inner wall of the outer shell 41 and supporting columns 43 arranged between the wicks 42 on the two sides. The material, such as aluminum or copper, of the outer shell 41 can be determined according to the material of the current collector to which the outer shell 41 is tightly attached. The outer shell 41 forms wrapping support of the internal structure of the flat heat pipe 4. The outer shell 41 has good heat conductivity and is thin in thickness. The thickness of the formed flat heat pipe 4 is generally not larger than 2 mm. The outer shell 41 and the liquid channel 2 can be connected together in a welding mode to form a whole. The thickness of the liquid channel 2 is generally not larger than 10 mm. The heat exchange fluid of the liquid channel 2 can be water, glycol/water mixed liquid, refrigerant and the like. A steam cavity 44 is formed between the supporting columns 43. The flat heat pipe is kept in a closed state and filled with a working medium (water, methanol and the like). During cooling, steam formed by the working medium absorbing heat of the battery cell unit 3 mainly flows upwards (in the direction of the liquid channel 2) and is cooled by the liquid channel 2 located at the upper part.

The supporting columns 43 can be made of a flame-retardant material such as polyimide and have good thermal stability and flame retardance. The supporting columns 43 made of the flame-retardant material have good flame-retardant characteristic. Under the combined action of the supporting columns 43 and the steam cavity 44, thermal runaway spreading can be restrained when an extreme thermal safety accident (such as a thermal safety accident caused by collision, piercing, short circuit and the like) happens to the battery cell. Each supporting column 43 can be divided into a plurality of sections, that is, channels are also arranged between the supporting columns 43 in the transverse direction. Steam in the steam cavity 44 can flow in the length direction of the supporting columns 43 and can also pass in the width direction of the supporting columns 43, so that uniform temperature transfer in the width direction of the supporting columns 43 is facilitated, and uniform temperature is achieved.

The wick 42 comprises a large-aperture foamy copper framework and a nano-coating arranged on the large-aperture foamy copper framework, that is, the wick 42 is of a cross-scale porous structure, the pore diameter of the foamy copper framework is micron scale, the pore diameter is large, the backflow resistance of the working medium can be reduced, the nanostructure on the surface is in nanoscale, and the backflow capillary force of the working medium can be generated. Decoupling of high capillary force and low flow resistance of the wick 42 is achieved through combination of the large-aperture framework and the nanostructure, and then the heat transfer performance of the flat heat pipe 4 is improved. Certainly, the wick 42 can be configured to achieve a similar effect.

Figure 1:
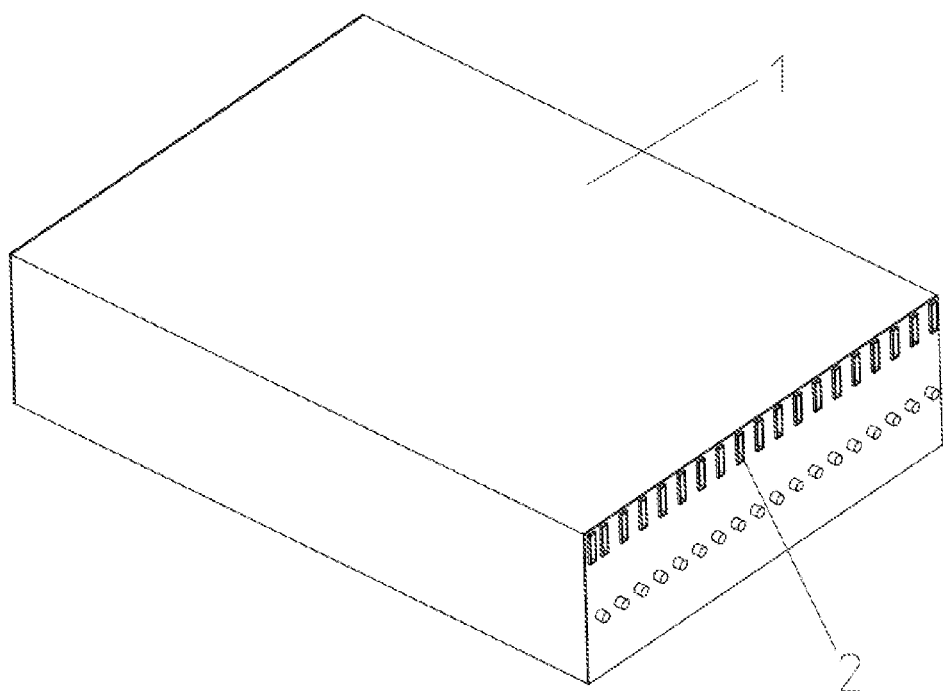
FIG. 1 is a structural schematic diagram of a power battery pack in the present disclosure.

As shown in FIG. 1, the present disclosure provides a power battery pack. The power battery pack comprises a shell and the power battery module packaged in the shell 1. The shell 1 is used for protecting the whole power battery module in a packaging mode, and a hole for connecting a circuit and a hole of the liquid channel 2 are formed in the shell 1.

As shown in FIG. 1 to FIG. 4, the present disclosure also provides a thermal management method of the power battery module. The thermal management method can be applied to the power battery module and the power battery pack, comprising the following steps:

arranging the heat pipe structure between the battery cell units 3 (the heat pipe structure can be a flat heat pipe 4 and also can be in the forms such as a tubular structure disclosed in the prior art), and tightly attaching the two sides of the heat pipe structure to the current collectors of the battery cell unit 3 respectively, wherein during attaching, the positive current collector 31 or the negative current collector 35 can be selected, the outer shell 41 of the heat pipe structure further can be made of the same material as the attached current collector, and the heat pipe structure is further connected with the liquid channel 2; and monitoring the temperature in the power battery module by using the battery temperature monitoring module such as a temperature sensor, a detector or a thermoelectric couple, and when the temperature is higher than or lower than a set value, cooling or heating a heat exchange fluid flowing through the heat pipe structure 2 by a cooling and heating system to achieve heat exchange between the battery cell unit 3 and the heat exchange fluid, wherein by means of the embedded structure, heat exchange between the battery cell unit 3 and the heat exchange fluid can be rapidly achieved, the temperature of the battery pack is well controlled, thermal runaway is reduced, and a good temperature equalizing effect is achieved.

The specific working process of the thermal management of the power battery is as follows.

During cooling, the temperature of the heat exchange fluid is reduced through an external refrigerating system, and the heat exchange fluid flows into the liquid channel 2. At the moment, the part, attached to the battery cell unit 3, of the flat heat pipe 4 is an evaporation section, and the part, combined with the liquid channel 2, of the flat heat pipe 4 is a condensation section. Heat of the battery cell unit 3 is transferred to the evaporation section of the flat heat pipe 4, and the working medium in the evaporation section is evaporated into steam and flows to the condensation section. Heat is transferred to the heat exchange fluid in the liquid channel 2 and condensed into liquid, and flows back to the evaporation section under the action of the wick 42.

During heating, the temperature of the heat exchange fluid is increased through the external heating system, and the heat exchange fluid flows into the liquid channel 2. At the moment, the part, attached to the battery cell unit 3, of the flat heat pipe 4 is a condensation section, and the part, combined with the liquid channel 2, of the flat heat pipe 4 is an evaporation section. The rest of the process is similar to that in the cooling working condition.

The supporting columns 43 can be arranged in the heat pipe structure. The steam cavity 44 is formed between the supporting columns 43. When an extreme thermal safety accident happens to the power battery module, failure of the heat pipe structure is caused, a blocking space is formed through the steam cavity 44, heat conduction between the battery cell units 3 is reduced, and thermal runaway spreading is restrained through the combined action of the supporting columns 43 made of a flame-retardant material and the steam cavity 44.

According to the above process, in the extreme conditions, when an extreme thermal safety accident (such as a thermal safety accident caused by collision, piercing, short circuit and the like) happens to the battery cell units 3, thermal runaway of the battery cell units 3 is inevitable, the working media in the flat heat pipe 4 is completely evaporated at high temperature, the outer shell 41 is broken, failure of the plate heat pipe 4 is caused, the blocking space is formed by the internal steam cavity 44, and heat conduction between the battery cell units 3 is greatly reduced. Meanwhile, the supporting columns 43 made of a flame-retardant material have good flame-retardant characteristic, and under the combined action of the supporting columns 43 and the steam cavity 44, thermal runaway spreading is restrained.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A power battery module, comprising:
 a plurality of battery cell units,
 a plurality of heat pipe structures, and
 a plurality of liquid channels,
 wherein
 one end of the heat pipe structure is embedded between the battery cell units, and the liquid channel is connected to the other end, which is not embedded into the battery cell unit, of the heat pipe structure,
 the battery cell unit comprises a positive current collector, a positive electrode material, a separator, a negative electrode material and a negative current collector which are arranged in sequence, and two sides of the heat pipe structure are tightly attached to the positive current collector or the negative current collector respectively, wherein the heat pipe structure is a flat heat pipe,
wherein the flat heat pipe comprises an outer shell, wicks attached to the inner wall of the outer shell and supporting columns arranged between the wicks on the two sides,
a steam cavity is formed between the supporting columns, and
the flat heat pipe is kept in a closed state and filled with a working medium.

2. The power battery module according to claim 1, wherein the outer shell of the heat pipe structure and the current collector tightly attached to the outer shell are made of the same material.

3. The power battery module according to claim 2, wherein the supporting column is a flame-retardant material, and each supporting column is divided into a plurality of sections.

4. The power battery module according to claim 2, wherein the wick comprises a large-aperture foamy copper framework and a nano-coating arranged on the large-aperture foamy copper framework.

5. The power battery module according to claim 1, wherein the number of the battery cell units between every two adjacent heat pipe structures is more than 20.

6. The power battery module according to claim 5, wherein the supporting column is a flame-retardant material, and each supporting column is divided into a plurality of sections.

7. The power battery module according to claim 5, wherein the wick comprises a large-aperture foamy copper framework and a nano-coating arranged on the large-aperture foamy copper framework.

8. The power battery module according to claim 1, wherein the supporting column is a flame-retardant material, and each supporting column is divided into a plurality of sections.

9. The power battery module according to claim 1, wherein the wick comprises a large-aperture foamy copper framework and a nano-coating arranged on the large-aperture foamy copper framework.

10. A power battery back, comprising a shell and the power battery module according to claim 1 packaged in the shell.

11. The power battery back according to claim 10, wherein an outer shell of the heat pipe structure and the current collector tightly attached to the outer shell are made of the same material.

12. The power battery back according to claim 10, wherein the number of the battery cell units between every two adjacent heat pipe structures is more than 20.

13. A thermal management method for the power battery module according to claim 1, comprising:
monitoring a temperature in the power battery module; and
when the temperature is higher than or lower than a set value, cooling or heating a heat exchange fluid flowing through the heat pipe structure to achieve heat exchange between the battery cell unit and the heat exchange fluid.

14. The thermal management method according to claim 13, wherein supporting columns made of a flame-retardant material are arranged in the heat pipe structure, a steam cavity is formed between the supporting columns, when an extreme thermal safety accident happens to the power battery module, the outer shell of the heat pipe structure is broken, the closed state of the heat pipe structure is damaged to cause failure of the heat pipe structure, the steam cavity is used for forming a blocking space, heat conduction between the battery cell units is reduced, and thermal runaway spreading is restrained through the combined action of the supporting columns and the steam cavity.

* * * * *